Sept. 29, 1942.   W. M. HAHNEMANN   2,297,216
TEST CIRCUIT ARRANGMENT
Filed March 29, 1939

Inventor:
Walter Max Hahnemann

Patented Sept. 29, 1942

2,297,216

UNITED STATES PATENT OFFICE 2,297,216

TEST CIRCUIT ARRANGEMENT

Walter Max Hahnemann, Berlin, Germany; vested in the Alien Property Custodian

Application March 29, 1939, Serial No. 264,785
In Germany October 13, 1937

4 Claims. (Cl. 250—11)

Testing methods are known in which the electrical quantities of various circuits are compared in an indicator one with another. When using direct current instruments as indicators, or in the case of push-pull circuit arrangements, it is necessary to introduce into the testing circuits rectifiers which rectify the test alternating currents, or which make a mixture of the test currents possible. When operating test circuit arrangements of this kind a difficulty arises in that the rectifiers introduced into the test circuits do not coincide exactly in their characteristics, and that the properties of the rectifiers vary continuously in different ways dependent upon the temperature or other exterior influences. The irregularities of the rectifiers produce a variation in the test quantities which result in testing errors.

By means of the invention under consideration a new method for the operation of the testing circuit arrangements described in the introduction hereof is provided which is free from the disadvantages due to the asymmetry of the test circuits. The new method consists in interchanging the rectifiers of the different test circuits one with the other in rapid succession. The irregularities of the individual rectifiers thus have the same effect on both circuits so that testing errors do not arise.

Figure 1:
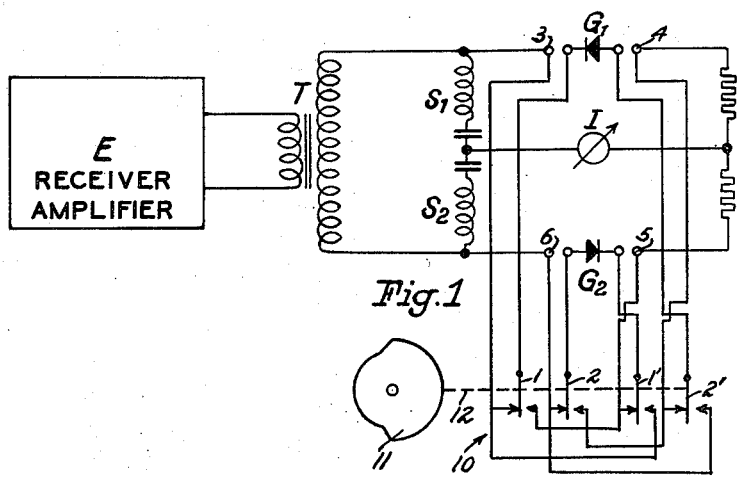
Figure 2:
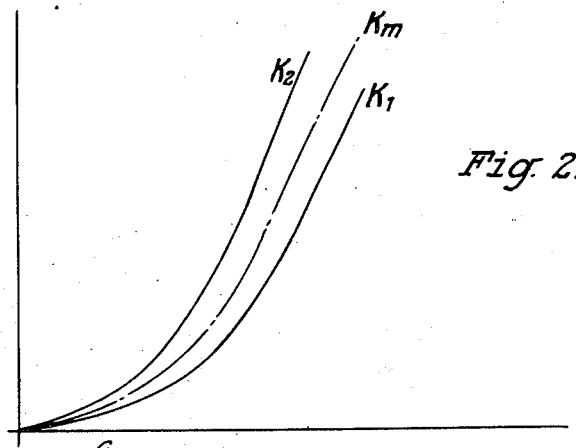
Figure 3:
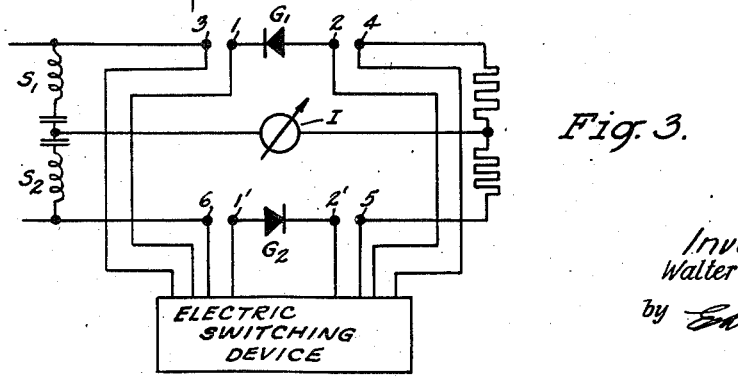

Fig. 1 of the accompanying drawing is a circuit arrangement that shows one embodiment of the invention. Fig. 2 is a graphic representation which serves to explain the operation of the arrangement shown in Fig. 1. Fig. 3 shows a modification of the invention.

A test circuit arrangement is here involved in which the alternating currents of two different frequencies are to be compared one with the other. A possibility of application for this arrangement, for example, lies in the field of wireless directing of vehicles, in which the field strength of two differently modulated antennae fields are compared with one another. The signals received by the antenna are rectified and amplified in a receiver E, and are then conveyed through transformer T to the test circuit arrangement. This contains resonance circuits $S_1$ and $S_2$, of which the one is tuned to the test frequency $f_1$, and the second to the other test frequency $f_2$. The voltages which arise at the oscillator circuits and the currents produced by these, are rectified by rectifiers $G_1$ and $G_2$ and compared in indicator I with one another. If the amplitudes of the test frequencies are equal then the instrument I will show no deflection, whilst if one or other of the frequencies predominates it will deflect to the right or left, and indicate the deviation of the receiving station from the guiding beam. Errors in testing can occur in this arrangement if the two rectifiers $G_1$ and $G_2$ have differing characteristics. It is assumed that the rectifier $G_1$ has the characteristic $K_1$, and the rectifier $G_2$ has the characteristic $K_2$ of Fig. 2. According to the invention the rectifiers $G_1$ and $G_2$ are interchanged one with the other in rapid succession. The terminals 1 and 2 of the rectifiers $G_1$ and the terminals 1' and 2' of the rectifiers $G_2$ will, therefore, be alternately connected with terminals 3, 4 and 5, 6. In consequence of this rapid switching-over a mean characteristic $K_m$, Fig. 2, becomes effective for both circuits.

In order to switch over the rectifiers, switching arrangements which are known per se may be used; for example, a rotating roller switch or similar mechanical device may be used. This arrangement comprises an ordinary multi-contact switch 10, provided with contact tongues 1, 2, 1', 2', connected to rectifiers $G_1$ and $G_2$, respectively, and corresponding contacts associated with the connecting lines at 3, 4, 5 and 6. Tongues 1, 2, 1', 2' are simultaneously operated into one of their two positions by means of a roller cam 11, as indicated by the broken line 12. By rotating cam 11 at a sufficient speed alternate reverse connections of $G_1$, $G_2$ in the opposite lines at the desired frequency may be accomplished.

The switching-over can also be effected electrically with the assistance of electrical switch relays, such as electron or ionic tubes. A block diagram of such an arrangement is shown in Fig. 3. The frequency of the switching-over will be adjusted according to the conditions which are governing at the time. It is essentially a question of the characteristics of the indicators used, in particular the inertia and attenuation of the indicator instrument.

The invention is not limited to the testing arrangement described as an example, and can, moreover, be used whenever electrical quantities of different circuits are to be compared one with another in arrangements wherein resistances with differing resistance characteristics are included in the test circuit. The method is, therefore, applicable where, instead of rectifiers, other resistances are used.

What is claimed is:

1. A testing arrangement comprising a plurality of electric test circuits, indicator means for comparing the relative magnitudes of the energy in said circuits, wave rectifier devices individual to said test circuits and connected to said indicator means, and means for regularly and mutually interchanging said rectifier devices with each other whereby unequal response characteristics of the rectifiers are compensated for in their effect on said indicating means whereby the indications are free from errors due to any inequalities in said response characteristics.

2. A testing arrangement according to claim 1, wherein said means for interchanging comprises mechanical switching apparatus.

3. A testing arrangement according to claim 1, wherein said means for interchanging comprises electrical switching equipment.

4. An arrangement for guide beam course indication, comprising a receiver, a pair of tuned circuits coupled to the output of said receiver, indicating means coupled to said tuned circuits for producing a guide indication, rectifiers connected separately between said tuned circuits and said indicating means, and continuously operating means for interchanging the connections of said rectifiers in rapid succession with respect to said tuned circuits, whereby an indication free of errors due to inequalities in said rectifiers is obtained.

WALTER MAX HAHNEMANN.